(12) United States Patent
Lincoln et al.

(10) Patent No.: US 10,171,627 B2
(45) Date of Patent: Jan. 1, 2019

(54) DOWNLOAD OF A PACKAGE OF CODE

(71) Applicant: INTERNATIONAL BUSINESS MACHINES CORPORATION, Armonk, NY (US)

(72) Inventors: Nicholas K. Lincoln, Hursley (GB); Josephine D. Messa, Hursley (GB); Simon D. Stone, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 14/857,056

(22) Filed: Sep. 17, 2015

(65) Prior Publication Data

US 2017/0083306 A1 Mar. 23, 2017

(51) Int. Cl.
G06F 9/445 (2018.01)
H04L 29/08 (2006.01)
G06F 8/60 (2018.01)

(52) U.S. Cl.
CPC .............. *H04L 67/34* (2013.01); *G06F 8/60* (2013.01); *H04L 67/2823* (2013.01); *H04L 67/306* (2013.01); *G06F 9/4451* (2013.01)

(58) Field of Classification Search
CPC ..... G06F 8/41; G06F 8/60; G06F 8/61; G06F 8/65; G06F 8/451; H04L 67/34
See application file for complete search history.

(56) References Cited

U.S. PATENT DOCUMENTS

| | | | |
|---|---|---|---|
| 5,995,756 A | 11/1999 | Herrmann | |
| 7,814,477 B2 | 10/2010 | Sun et al. | |
| 8,032,860 B2 | 4/2011 | Piehler et al. | |
| 8,635,673 B2 | 1/2014 | Anand et al. | |
| 8,732,662 B1 | 5/2014 | Savant | |
| 8,793,359 B1 | 7/2014 | Fiebig et al. | |
| 8,850,528 B2 | 9/2014 | Van Biljon et al. | |
| 2002/0138545 A1* | 9/2002 | Andreakis | G06F 8/61 709/200 |
| 2006/0265702 A1* | 11/2006 | Isaacson | G06F 8/61 717/168 |
| 2006/0277286 A1* | 12/2006 | Zhang | G06F 17/30867 709/223 |

(Continued)

OTHER PUBLICATIONS

Roberto Di Cosmo et al., Package Upgrades in FOSS Distributions: Details and Challenges, ACM, 2008, retrieved online on Sep. 14, 2018, pp. 1-5. Retrieved from the Internet: <URL: http://delivery.acm.org/10.1145/1500000/1490292/a7-di_cosmo.pdf?>.; (Year: 2008).*

(Continued)

*Primary Examiner* — Hanh Thi-Minh Bui
(74) *Attorney, Agent, or Firm* — Heslin Rothenberg Farley & Mesiti P.C.; Richard Wilhelm

(57) ABSTRACT

A server receives a request from a client for download of a package of code, and determines a set of available modifications for the requested package of code. A user profile for a user of the client is accessed, a set of desired modifications for the package of code from the accessed user profile is determined, the package of code is modified according to the determined desired modifications that exist in the determined available modifications for the requested package of code, and the modified package of code is transmitted to the client.

12 Claims, 6 Drawing Sheets

(56) References Cited

U.S. PATENT DOCUMENTS

| | | |
|---|---|---|
| 2011/0066999 A1* | 3/2011 | Rabinovich .............. G06F 8/51 |
| | | 717/104 |
| 2011/0126168 A1 | 5/2011 | Ilyayev |
| 2011/0209141 A1 | 8/2011 | Hughes |
| 2012/0174061 A1 | 7/2012 | McCollum et al. |
| 2013/0263086 A1 | 10/2013 | Carter et al. |
| 2014/0032650 A1* | 1/2014 | Singh ..................... H04L 41/00 |
| | | 709/203 |
| 2014/0156467 A1* | 6/2014 | Typaldos .............. G06Q 30/04 |
| | | 705/26.81 |
| 2014/0157254 A1 | 6/2014 | Hoff et al. |
| 2014/0372963 A1 | 12/2014 | Chandaria et al. |

OTHER PUBLICATIONS

Lincoln, Nicholas K. et al., "Downloading a Package of Code," U.S. Appl. No. 14/856,806, filed Sep. 17, 2015, pp. 1-27.

List of IBM Patents or Patent Applications Treated as Related, Sep. 17, 2015, pp. 1-2.

Office Action dated Nov. 16, 2016 for U.S. Appl. No. 14/856,806, 20 pages.

Final Office Action dated Apr. 5, 2016 for U.S. Appl. No. 14/856,806, 25 pages.

* cited by examiner

DOWNLOAD OF A PACKAGE OF CODE

BACKGROUND

One or more aspects of the present invention relate to downloading a modified package of code.

SUMMARY

In accordance with an aspect of the present invention, a computer-implemented method is provided. The computer-implemented method includes receiving at a server a request from a client for download of a package of code; determining a set of available modifications for the package of code; accessing a user profile for a user of the client; determining a set of desired modifications for the package of code from the accessed user profile; modifying the package of code according to the determined set of desired modifications that exist in the determined set of available modifications for the package of code; and transmitting the modified package of code to the client.

In accordance with another aspect of the present invention, a system is provided. The system includes a network interface to receive a request for download of a package of code from a client; and a processor connected to the network interface, wherein the system is configured to perform a method. The method includes receiving the request from the client for download of the package of code; determining a set of available modifications for the package of code; accessing a user profile for a user of the client; determining a set of desired modifications for the package of code from the accessed user profile; modifying the package of code according to the determined set of desired modifications that exist in the determined set of available modifications for the package of code; and transmitting the modified package of code to the client.

In accordance with yet another aspect of the present invention, a computer program product is provided. The computer program product includes a computer readable storage medium readable by a processing circuit and storing instructions for execution by the processing circuit for performing a method. The method includes receiving at a server a request from a client for download of a package of code; determining a set of available modifications for the package of code; accessing a user profile for a user of the client; determining a set of desired modifications for the package of code from the accessed user profile; modifying the package of code according to the determined set of desired modifications that exist in the determined set of available modifications for the package of code; and transmitting the modified package of code to the client.

BRIEF DESCRIPTION OF THE DRAWINGS

Embodiments of the present invention will now be described, by way of example only, with reference to the following drawings, in which.

DETAILED DESCRIPTION

One or more aspects of the present invention relate to the use of a user profile to determine modifications to a package of code, prior to the download of the modified package of code.

Figure 1:
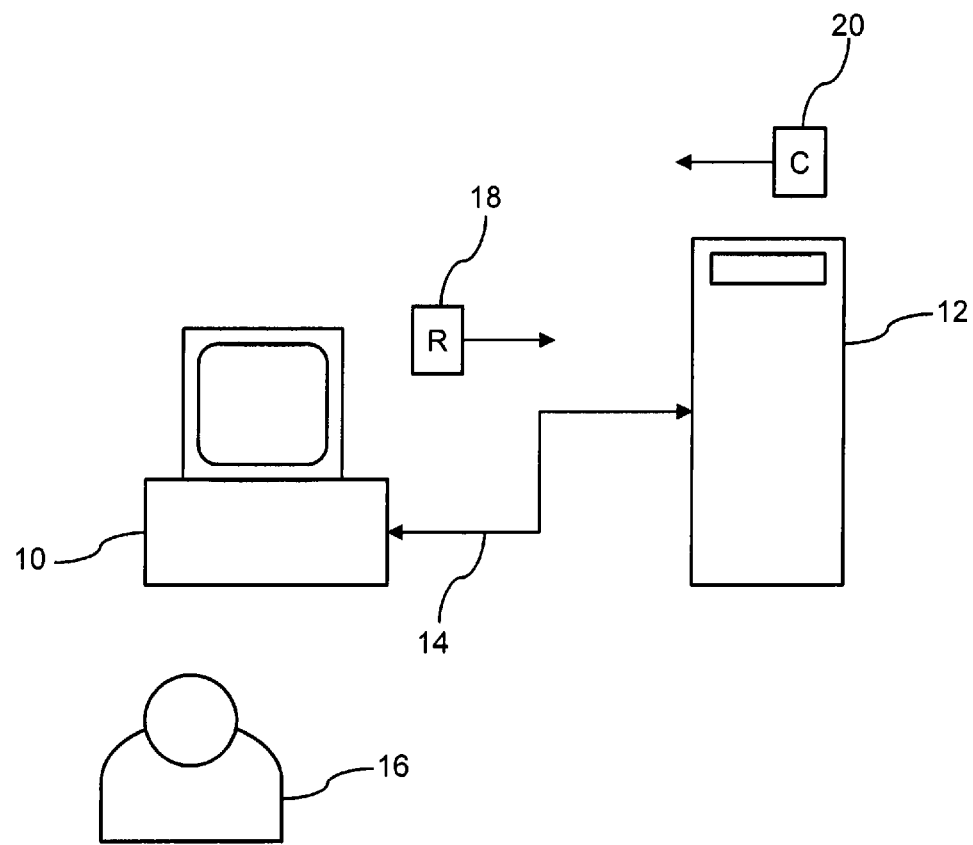
FIG. 1 is one example of a schematic diagram of a client and server.

FIG. 1 shows one example of a schematic diagram of a client 10 in communication with a server 12 over a communication network 14. A user 16 of the client device 10 sends a request 18 to the server 12 for the purpose of downloading a package of code 20. Platform as a service, known as PaaS, builds upon the concept of software as a service, known as SaaS, in which applications are hosted by a vendor or service provider at the server 12 and made available to customers over the network 14, which can be the Internet. Requests 18 are made to the server 12 over the network 14 and the server 12 responds by transmitting the code 20 to the client 10.

When the user 16 downloads the package of code 20, they may find themselves doing similar tasks to configure that code 20 for their development environment each time they make such a download. A development environment may refer to which IDE (integrated development environment) the user 16 uses (for example, eclipse), which operating system the user 16 uses, and which utility APIs (application program interfaces) the user 16 may regularly use in the developed code (for example, logging APIs). The user 16 would import the downloaded code 20 into their development environment, and step by step ensure that the downloaded code 20 is suitable for their development system, being run by the client 10.

For example, if the user 16 has downloaded source code, the user 16 can import this into their IDE to create a project structure, then use a tool that can convert line endings from Windows to UNIX format, or change tabs to a set number of spaces (code-beautifiers/formatters can do this by parsing files and making changes). This is a repetitive task that is to be done for every single file in the package 20. This becomes more of an issue in the case where the user 16 is downloading binary code. The user is very limited to the changes that can be made (if at all) to the code package 20. For example, the user has no control over the level of debug information with which the downloaded code 20 was built, or in the case when the binaries may include a public API, which naming conventions are used. Tools are available that allow for closer inspection of binary files, but using such tools is complicated by possible obfuscation used in the original compilation process and successful use of such tools would require the user to understand the structure of the code so as not to cause breakages.

Figure 2:
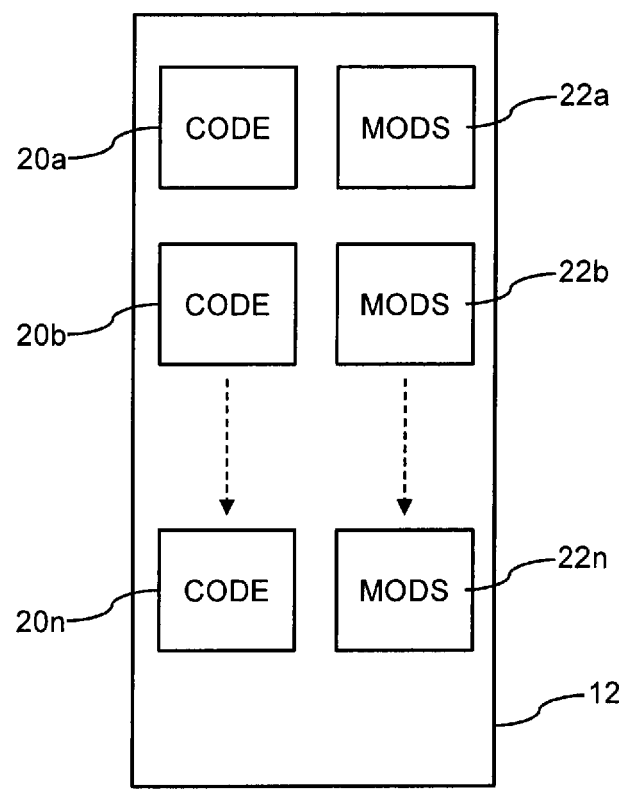
FIG. 2 is one example of a schematic diagram of code packages stored within a server.

The server 12 is configured to allow the original developer of the compiled code to decide and control how a user 16 could alter the code prior to download time, resulting in this process becoming more reliable. The server 12 allows the developer to specify a number of preferences in advance of downloading a code package, and have these preferences interpolated into the code. This is especially useful in the case of binary code packages where the user would have no way of making changes to the code once it is downloaded. FIG. 2 illustrates schematically within the server 12 a number of different code packages 20 (e.g., 20a-20n), each of which is provided with a set of available modifications 22 (e.g., 22a-22n) for the package of code 20.

When a developer makes a code package 20 available for download, in either binary or source code form, they may specify a number of preferences available to alter parts of the code, which are detailed in the set of available modifications 22. A user 16 looking to download a code package 20 can then supply their preferences in the form of a user profile and the code package 20 is dynamically altered to accommodate these preferences and offered for download so that the user 16 can immediately consume the code package 20, without the need to make any further modifications. The user's profile is compared to the available modifications to determine which modifications will be applied before the modified code package 20 is downloaded.

A user's preferences are defined in a user profile, which comprises, for instance, a set of fields that define a user's preferences in specific defined areas. The preferences defined in the user profile could include which language the functionality of the code package 20 is provided, code formatting preferences (for example tabs or spaces, line endings), generating project metadata for use in different IDEs (for example project files in eclipse), setup to integrate with different logging or utility APIs that the user 16 may already use, include source files or just binaries, the level of debug information and naming conventions, as examples. Previously, in the case of a user 16 downloading binary code, there was no way to specify these preferences, and in the case of source code, the user 16 would manually need to change every file, even if the user 16 was using a tool such as a code beautifier to do so.

The server 12 is able to parse the user's profile to ascertain the user's preferences. Once the user preferences have been accessed, the server 12 that is providing the downloaded code can begin to modify the code package, making use of a number of existing tools, or post-processing methods. The server 12 may have different versions of the code packages 20 saved. For example, the server 12 may have a Windows and a UNIX version of the code, on which further processing will take place. Once each of the user's preferences have been applied to the code 20, the code 20 is packaged up, which may include compiling the code if it is being provided as a binary, and then made available for the user 16 to download.

The server 12 provides a system that uses user provided preferences to enable modification of a code package 20 prior to download. A developer makes a code package available for download on the server 12, which enables dynamic code package modification. The developer is able to provide a list of permitted modifications for their code package 20 to a hosting system run by the server 12. When a developer uploads a code package to the server 12 they are provided with a list of options that define permitted modifications that are supported by the server 12. The developer makes the selections and performs appropriate actions defined by those selections. For example, if a developer is given an option to indicate that help files are available in more than one language, then they can select that option, indicate the languages available and link the necessary files to the indicated options, all carried out within the interface to the server 12 that is accessed by the developer. A user 16 can browse for the code package 20 and select to download. The code package 20 is modified based upon a user profile accessible by the hosting system on the server 12. The hosting system takes the preferences, applies the modifications to the code package 20, and provides the code package 20 to the user 16.

Figure 3:
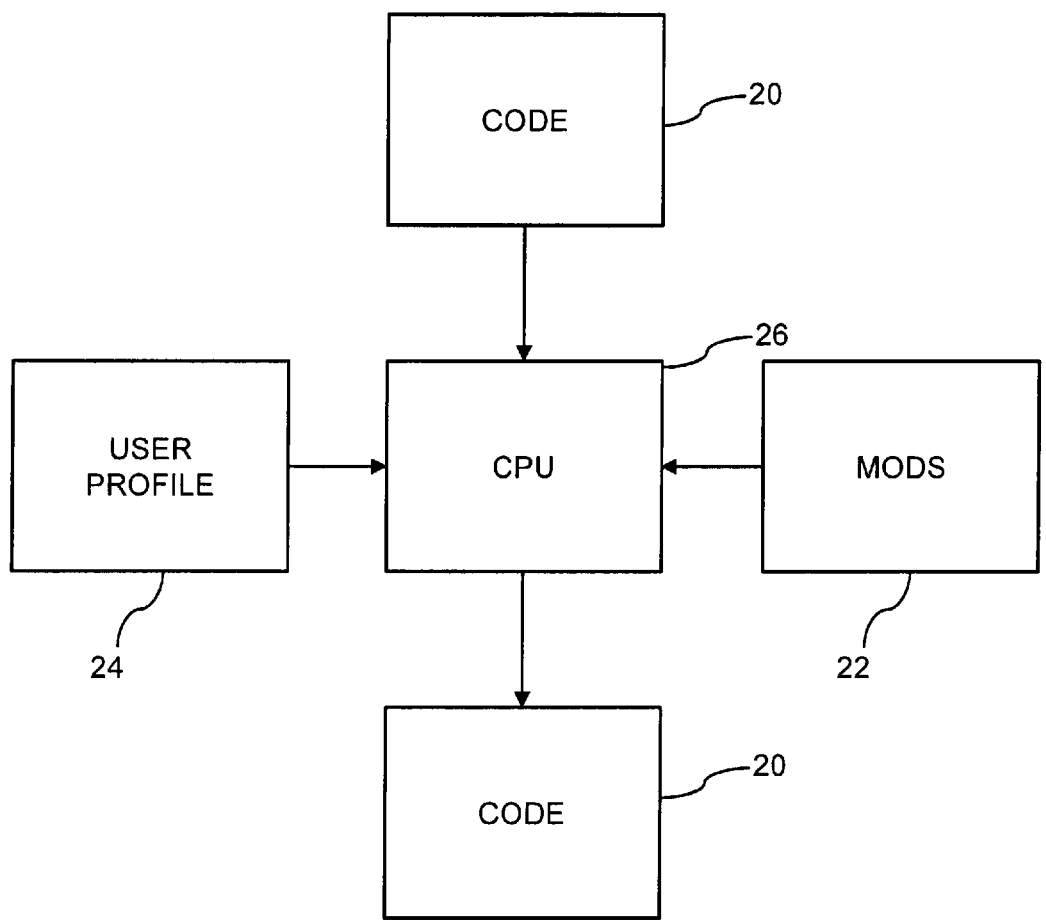
FIG. 3 is one example of a schematic diagram of a code modification process.

The server 12 is a system that facilitates the above user flow, namely a hosting server that will permit user supplied preferences, which are a subset of permitted change preferences, to be supplied and dynamically incorporate these preferences into code package 20 downloaded by a user 16 of the server 12. FIG. 3 summarizes the elements within the system. A processor 26 within the server 12 accesses the code package 20, the set of available modifications 22 and the user profile 24. These are used to output the modified code package 20, which is then downloaded by the user 16.

Figure 4:
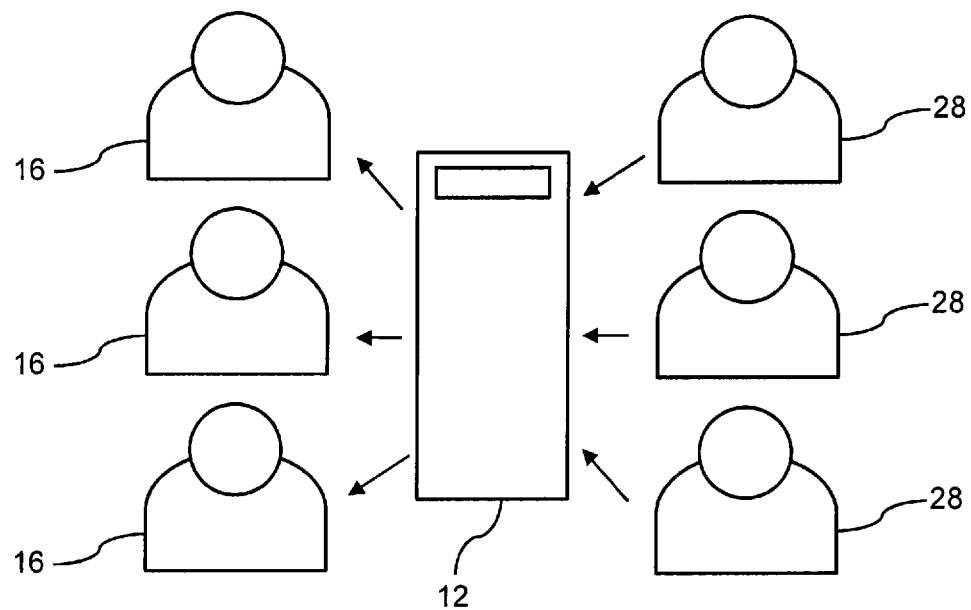
FIG. 4 is one example of a schematic diagram of users and developers of code packages.

FIG. 4 illustrates schematically developers 28 who can upload code packages to the server 12 for access by the users 16. All contributing developers 28 that upload code packages 20 to the server 12 can hold an account with the server 12, though the users 16 of the server 12, who download contributions, do not require an account to access resources, though a better level of service may be available if the users 16 do hold an account. The server 12 stores source code provided by the developers 28. The contributing developer 28 will upload these files from their account, enabling general tracking, monitoring and editing of all their contributions. Only the contributing developer 28 has the right to edit their uploaded contributions. At the time of upload, the developer 28 tags the permitted options for their code contribution that include but are not limited to binary only, debug level etc., as discussed in detail above. A code package that has been uploaded by a developer 28 has the permitted modifications set by the developer 28 before the code package is made available for download by end users 26 of the server 12.

The listed options are held within a preferences section for the respective code contributions, which enables a faster contribution process, though each contribution can have different options applied. In such an implementation, the modification options accessed by the server 12 at the time of upload would be selected according to the content of the user's profile 24. The original developer 28 may edit the list of possible download options for a contribution at any time, or remove a contribution completely. The server 12 now has a code package 20 that may be searched for by a user 16 of the server 12. Typical searches can include keywords, all contributions from a specific developer 28 and so on.

At the point of code package consumption, the server 12 can communicate with any user 16 with an account with the server 12. A user 16 searches on the server 12 for a code package 20 and selects to download the package 20. At this point, the permitted customization options that were made available by the developer 28 are matched to the user's user profile 24, which will determine the modifications to make to the code package 20 prior to the download. The user's profile 24 defines the user's preferences in a manner that can be accessed and understood by the server 12. The profile 24 can have a set of populated fields, such as a language field that might be German, for example. The server 12 parses the profile 24 to access the user's preferences and these are then used by the server 12 to be compared against the available modifications set by the developer 28 when the code package was first uploaded by the developer 28. The user's profile 24 determines which modifications are to be made to the code package 20 by the server 12. The modifications are then made to the code package 20, without requiring any user intervention at this point.

Once the user 16 selects to download the code package 20, the server 12 applies the supplied preferences to the target code 20, editing the code to fulfil the preference requirements. A non-exhaustive set of possible user supplied preferences are discussed below. For example, the user 16 may want a specified programming language. This option depends on how the developer 28 contributed code. For example, an option to choose between multiple programming languages that the developer 28 has uploaded may exist, or alternatively a nominated programming language could be generated based upon systems such as Swagger. Swagger contains a template-driven engine to generate client code in different languages by parsing a Swagger Resource Declaration.

The user 16 may want a specified native language to be used in the code package 20 that they download. Two alternatives can be considered, firstly that the user 16 wants code comments in a particular language, or secondly that the user 16 would like comments and variable names to be in a particular language. If using generated code, a language setting could be present that would force generation of a target code package in a target language. Alternatively, the server 12 would automate an editing of the generated code 20 using an external system such as Google Translate to perform a translation function. If an automated system is used, then a link to an external web service has to be stored by the server 12 with the format of accepted queries to the external web service. The server 12 will then generate a query to the web service and receive back a reply that can be used in the code modification. The server 12 relies on the reliability of the external service in this example, and the reply returned is used in the code modification as a "best attempt" modification. Using an external translation service would only be as good as the quality of the specific web service accessed. The most basic option would be to have the developer 28 provide their code 20 in multiple languages.

If the user 16 only wants binaries, then in such instances, the server 12 compiles the source code with the relevant preferences (e.g., operating system, architecture, bitness) applied and provides the output binaries for download. If the user 16 wants debug code, then numerous languages facilitate the option of debug behavior, which may or may not be part of a compiler option. Since the developer 28 has provided source code, or the source code has been generated, the server 12 applies debug level compilation of the source code into binaries (in the case of C code for example) or ensures that the appropriate debug settings are applied (within Java or similar code).

If the user 16 wants a specific code style relating to the subjective consideration of tabs vs spaces, number of spaces, line ending, scope brace location, and so on, then the user 16 can specify such settings in their user profile which may be accessed by the server 12. The server 12 feeds these preferences into the processor 26 that is dynamically generating the code package 20. Following from the use of Swagger, discussed above, a template-driven engine could be used to accept subtle changes in layout provided as options, with defaults in the cases where no option was provided.

Upon completion of the processes to satisfy the set of permitted user preferences, the modified code package 20 is provided to the user 16 for direct integration with their code project. The modified code package comprises a set of components that have been derived from the original code package requested by the user. The modified code package takes into account the user's preferences, as defined by the user profile, as far as they are supported by the available modifications defined by the original developer.

Figure 5:
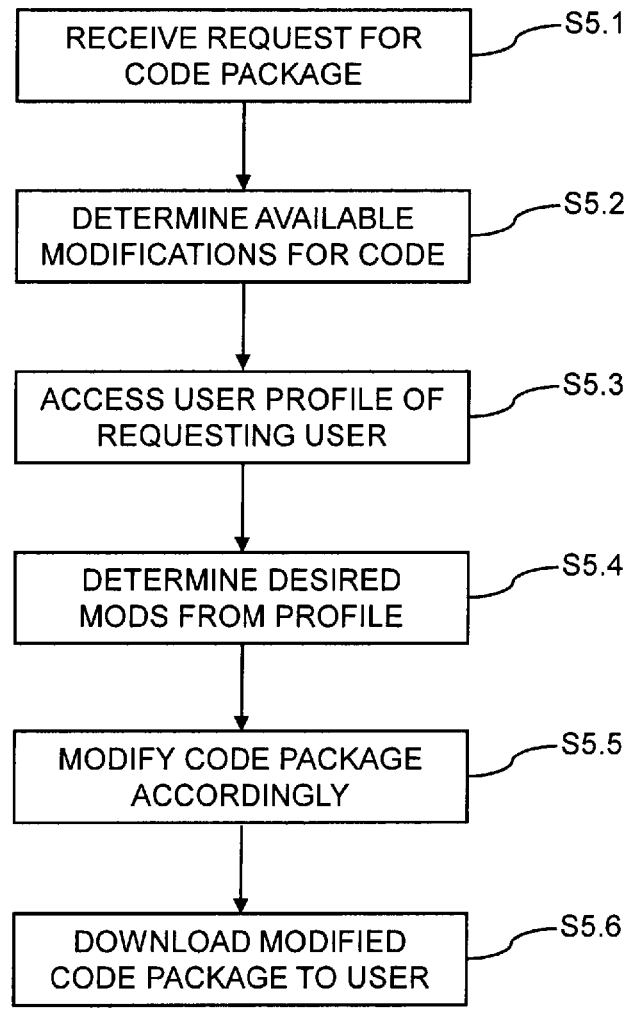
FIG. 5 is one example of a flowchart of a method of operating the server.

One example of a method of operating the server is summarized in the flowchart of FIG. 5. The computer implemented method comprises firstly step S5.1 receiving at the server 12 a request 18 from a client 10 for the download of a package of code 20. The next step of the method comprises step S5.2, which comprises determining a set of available modifications 22 for the requested package of code 20. As discussed above, the developer 28 who is responsible for the original upload of the package of code 20 to the server 12 will specify the optional modifications allowed at the time of uploading the code package 20. These available modifications can be stored as a file or as metadata for the code package 20.

Step S5.3 comprises accessing the user profile 24 (which is, e.g., in the form of a set of populated fields defining the user's preference for specific predefined topics) for the user 16 of the client 10 and following this, step S5.4 comprises determining a set of desired modifications for a package of code 20 from the accessed user profile 24. The user profile 24 can be stored by the server 12 as part of the user's account information or could be sent from the client 10 with the request 18 being made by the user. The processor 26 of the server 12 is able to compare the preferences defined within the user profile 24 with the modifications available within the definition 22 attached to the code package 20 and select the modifications accordingly.

The final two steps of the method comprise step S5.5, which comprises modifying the package of code 20 according to the determined desired modifications that exist in the determined available modifications for the requested package of code 20, and step S5.6, which comprises transmitting the modified package of code 20 to the client 10. The process of performing the modification of the code package 20 can take a number of different forms, depending on the nature of the preferences within the user profile 24 and depending on the options made available by the original developer 28.

For example, in a simple situation, the stored code package 20 may comprise two versions of a specific API, one to run on Windows and one to run on Linux. In this case, the user's profile 24 may indicate that they use Linux and the modification of the code package 20 comprises the selection of the Linux version within the code package 20 and this is what is provided to the end user 16 at their client 10. Extending the example, there may be four versions in total, with each Windows and Linux version being provided both as source code and as binary. The server 12 stores the four versions with suitable metadata defining the content of the different versions. The user's profile 24 determines which of the four versions is selected in the modification step S5.5 and provided to the user in the download step S5.6.

Figure 6:
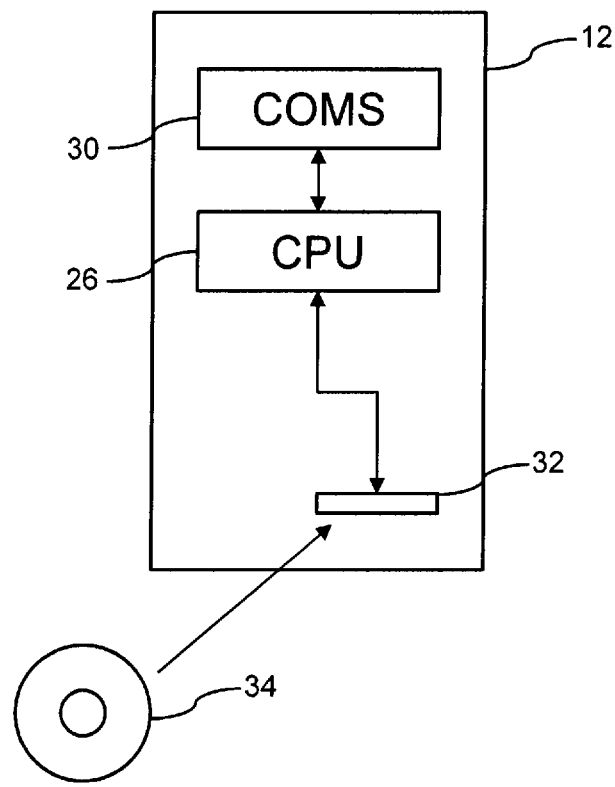
FIG. 6 is one example of a schematic diagram of the server.

FIG. 6 shows more detail of the server 12, which is a system that comprises a network interface 30 that receives the request 18 for download of the package of code 20 from the client 10 and transmits the modified package of code 20 to the client 10, and a processor 26 which is connected to the network interface 30 and accesses available modifications for the code package 20 and a user profile 24 and modifies the package of code 20 according to a match between the user's desired modifications and those available for the specific code package 20. The network interface 30 could be connected to a wide area network such as the Internet and communications are received by and transmitted from the server 12 using the HTTP (Hypertext Transfer Protocol) protocol. The server 12 also includes a CD-ROM drive 32 connected to the processor 26. The server 12 also includes numerous other components, but these are omitted for clarity purposes.

Also shown in the Figure is a computer program product 34 for controlling the server 12, the computer program product 34 comprising a computer readable storage medium (a CD-ROM) having program instructions embodied therewith, the program instructions executable by the processor 26 to cause the processor 26 to perform the necessary actions in response to the receipt of the request 18 from a client 10.

The CD-ROM 34 can be inserted into the CD-ROM drive 32, in order for the processor 26 of the server 12 to access the computer program product. The server 12 is operated according to the instructions on the CD-ROM 34 which control the processor 26 of the server 12.

When a user 16 connects through their client 10 to the server 12 to download a code package 20, then the first action that the user 16 will take is to open a web browser on their machine 10 and navigate to the HTTP address of the download service offered by the server 12. The user 16 then logs into their account with the web service and uses a search function on the website to find one or more code packages 20 to download. The user 16 then selects a code package 20 that they wish to download. At this point, the server 12 will determine the set of available modifications for the requested package of code 20, access the user profile 24 of the user 16 and determine the user's desired modifications for code packages.

However, it is possible at this stage that there are modifications available to which the user 16 has never been exposed before and/or does not have any specific preference. Returning to the example detailed above, there may be four versions of an API being stored as part of a code package, with Windows and Linux versions being provided both as source code and as binary files. In addition there may be an option to set a debug level in relation to the final code package 20 that is downloaded. In this case there are effectively eight different combinations available ($2^3$), Windows or Linux, source code or binaries, low debug level or high debug level.

In this example, the user's profile 24 may make no mention of the debug level. In response, the server 12 can either choose a default option for this modification or an output detailing the available modification for the requested package of code 20 that is not present in the user's set of desired modifications can be generated and sent back to the user 16 via their client. A user input comprising a selection with respect to the new modification can then be received by the server 12, where the user indicates their preference in relation to this specific option. The user 16 may indicate a low level of debug information, for example. This selection is then taken into account in the modification process.

A user 16 who makes a selection in this way will have their user profile 24 updated to reflect the preferred modification that they have just chosen. The server 12 updates the user profile 24 to include a new entry that details the user's preference in respect of the specific modification that has just been queried by the server 12 to the user 16. The user 16 can access their profile 24 at any time and update the profile 24 manually if they wish. In the example above, a new entry would be created within the user's profile 24 that includes the user's preference in relation to a debug level. Any future downloads made by the user 16 will now take into account the user's preference in relation to this potential modification.

The set of available modifications for a requested package of code 20 can comprise a preferences definition that is stored with the requested package of code 20 in the form of metadata about the available modifications, such as two letter codes for language files, DE meaning a German language version, for example. The server 12 can set the format of this metadata as desired and the developer 28 either authors the metadata when they upload a code package 20 or the server 12 presents the developer 28 with specific choices that are then converted into the necessary metadata (using a routine run by the server 12 for example) for storage with the particular code package 20. Modifications defined in this way either require additional components to be present within the code package 20 that is stored by the server 12 (for example in the case of Windows and Linux versions being available) or can be performed by the server 12 as when they are needed (for example in the case of language translation of components within source code or if the server 12 creates binary files on demand from stored source code).

As described herein, according to one aspect of the present invention, there is provided a computer implemented method comprising receiving at a server a request from a client for download of a package of code, determining a set of available modifications for the requested package of code, accessing a user profile for a user of the client, determining a set of desired modifications for a package of code from the accessed user profile, modifying the package of code according to the determined desired modifications that exist in the determined available modifications for the requested package of code, and transmitting the modified package of code to the client.

According to another aspect of the present invention, there is provided a system comprising a network interface arranged to receive a request for download of a package of code from a client and to transmit the modified package of code to the client, and a processor connected to the network interface and arranged to determine a set of available modifications for the requested package of code, to access a user profile for a user of the client, to determine a set of desired modifications for a package of code from the accessed user profile and to modify the package of code according to the determined desired modifications that exist in the determined available modifications for the requested package of code.

According to yet another aspect of the present invention, there is provided a computer program product for controlling a server, the computer program product comprising a computer readable storage medium having program instructions embodied therewith, the program instructions executable by a processor to cause the processor to receive at a server a request from a client for download of a package of code, determine a set of available modifications for the requested package of code, access a user profile for a user of the client, determine a set of desired modifications for a package of code from the accessed user profile, modify the package of code according to the determined desired modifications that exist in the determined available modifications for the requested package of code, and transmit the modified package of code to the client.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving at a server a request from a client for download of a package of code selected from the group consisting of: binary code and source code;
determining a set of available modifications for the package of code, wherein the set of available modifications were specified upon upload of the package of code;
accessing a user profile for a user of the client;
analyzing the user profile to automatically determine, without user intervention, a set of desired modifications for the package of code from the accessed user profile;
identifying a portion of the determined set of desired modifications that comprise the determined set of available modifications for the package of code, based on comparing the determined set of desired modifications to the determined set of available modifications;
detecting an available modification for the package of code that is not specified by a respective desired modification in the set of desired modifications within the accessed user profile;
requesting a selection of the respective desired modification for the available modification by providing an output detailing the available modification for the package of code;
receiving a user input comprising the selection;

automatically modifying, without user intervention, at the server, a portion of code comprising the package of code according to the portion of the determined set of desired modifications and according to the selection; and responsive to the request, transmitting the modified package of code to the client in a state wherein the client can immediately utilize the modified code package.

2. The computer-implemented method according to claim 1, further comprising updating the user profile according to the selection.

3. The computer-implemented method according to claim 1, wherein the determining the set of available modifications for the package of code comprises accessing a preferences definition stored with the package of code, and wherein the modified code package is a binary code package.

4. The computer-implemented method according to claim 1, wherein the modified code package is a binary code package that cannot be modified by the user upon conclusion of the transmitting.

5. A system comprising:
  a network interface to receive a request for download of a package of code from a client; and
  a processor connected to the network interface, wherein the system is configured to perform a method, the method comprising:
  receiving the request from the client for download of the package of code selected from the group consisting of: binary code and source code;
  determining a set of available modifications for the package of code, wherein the set of available modifications were specified upon upload of the package of code;
  accessing a user profile for a user of the client;
  analyzing the user profile to automatically determine, without user intervention, a set of desired modifications for the package of code from the accessed user profile;
  identifying a portion of the determined set of desired modifications that comprise the determined set of available modifications for the package of code, based on comparing the determined set of desired modifications to the determined set of available modifications;
  detecting an available modification for the package of code that is not specified by a respective desired modification in the set of desired modifications within the accessed user profile;
  requesting a selection of the respective desired modification for the available modification by providing an output detailing the available modification for the package of code;
  receiving a user input comprising the selection;
  automatically modifying, without user intervention, at the server, a portion of code comprising the package of code according to the portion of the determined set of desired modifications and according to the selection; and
  responsive to the request, transmitting the modified package of code to the client in a state wherein the client can immediately utilize the modified code package.

6. The system according to claim 5, wherein the method further comprises updating the user profile according to the selection.

7. The system according to claim 5, wherein the determining the set of available modifications for the package of code comprises accessing a preferences definition stored with the package of code.

8. The system according to claim 5, wherein the modified code package is a binary code package that cannot be modified by the user upon conclusion of the transmitting.

9. A computer program product comprising:
  a computer readable storage medium readable by a processing circuit and storing instructions for execution by the processing circuit for performing a method comprising:
  receiving the request from the client for download of the package of code selected from the group consisting of: binary code and source code;
  determining a set of available modifications for the package of code, wherein the set of available modifications were specified upon upload of the package of code;
  accessing a user profile for a user of the client;
  analyzing the user profile to automatically determine, without user intervention, a set of desired modifications for the package of code from the accessed user profile;
  identifying a portion of the determined set of desired modifications that comprise the determined set of available modifications for the package of code, based on comparing the determined set of desired modifications to the determined set of available modifications;
  detecting an available modification for the package of code that is not specified by a respective desired modification in the set of desired modifications within the accessed user profile;
  requesting a selection of the respective desired modification for the available modification by providing an output detailing the available modification for the package of code;
  receiving a user input comprising the selection;
  automatically modifying, without user intervention, at the server, a portion of code comprising the package of code according to the portion of the determined set of desired modifications and according to the selection; and
  responsive to the request, transmitting the modified package of code to the client in a state wherein the client can immediately utilize the modified code package.

10. The computer program product according to claim 9, wherein the method further comprises updating the user profile according to the selection.

11. The computer program product according to claim 9, wherein the determining the set of available modifications for the package of code comprises accessing a preferences definition stored with the package of code.

12. The computer program product according to claim 9, wherein the modified code package is a binary code package that cannot be modified by the user upon conclusion of the transmitting.

* * * * *